Dec. 3, 1963  W. F. HUCK  3,112,657
RECIPROCATION BALANCING MECHANISM
Original Filed Nov. 1, 1957
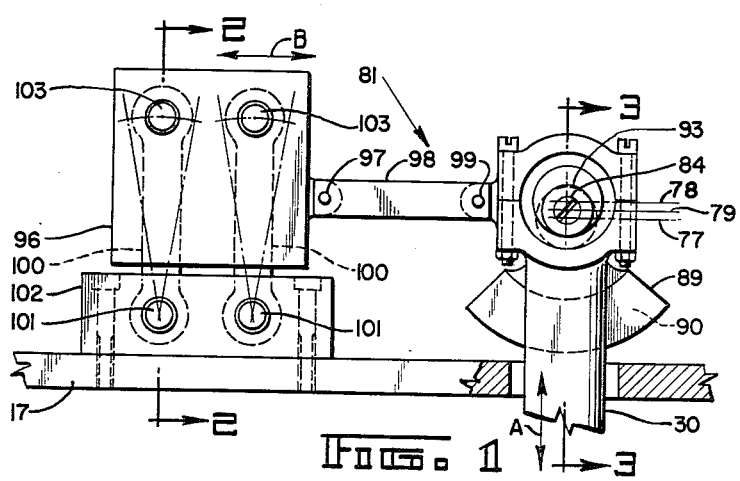
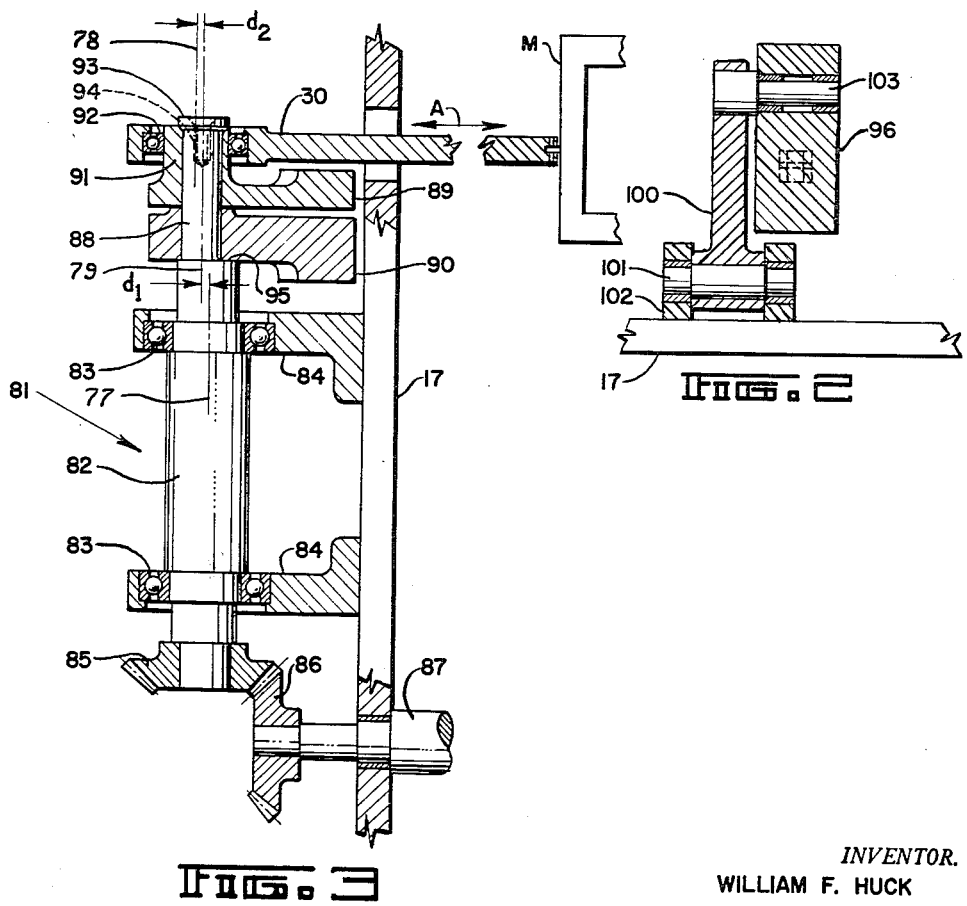
*INVENTOR.*
WILLIAM F. HUCK
BY
*Albert C. Johnston*
ATTORNEY

United States Patent Office 3,112,657
Patented Dec. 3, 1963

3,112,657
RECIPROCATION BALANCING MECHANISM
William F. Huck, Forest Hills, N.Y., assignor, by mesne assignments, to William F. Huck, doing business as Huck Company, New York, N.Y.
Original application Nov. 1, 1957, Ser. No. 693,924, now Patent No. 2,997,951, dated Aug. 29, 1961. Divided and this application Aug. 28, 1961, Ser. No. 134,172
10 Claims. (Cl. 74—590)

This invention relates to a device or mechanism for reciprocating a mass and, more particularly, to a device or mechanism for balancing continuously the cyclical acceleration forces which arise during the reciprocations of the mass.

The invention is useful as a component of reciprocating machines of various kinds and especially for machines in which it is desirable to reciprocate heavy masses at speeds which, if the resulting cyclical force changes were not balanced, would result in excessive or destructive stresses or vibrations.

One of the important uses of the invention is for the balanced reciprocation of the wiping carriage of an intaglio printing press; for example, as disclosed in a copending application entitled "Wiping and Polishing Device for Intaglio Printing Presses," Serial No. 693,924, filed November 1, 1957, now Patent No. 2,997,951, of which the present application is a division.

It is an important object of the present invention to provide a device or mechanism for reciprocating a heavy mass, by which the forces of changing direction and magnitude which arise during the reciprocations of the mass are continuously counterbalanced, so that vibrations are reduced or eliminated and the machine containing the mass may be kept running in a relatively smooth and stable condition, or so that its running speed may be increased if desired.

A further object of the invention is to provide a reciprocation balancing device or mechanism by which the length of the stroke of the reciprocations may be adjusted and yet the forces arising from the reciprocations will be kept balanced for every stroke length.

According to the present invention, the reciprocation of a mass such as a carriage or other machine component that is to be kept continuously in reciprocatory movement is brought about through an eccentric connection of the mass with a continuously driven rotary shaft; the acceleration forces arising during the reciprocatory movements are counteracted by a reciprocable countermass which also has an eccentric connection with the shaft, through which it too is reciprocated as the shaft is rotated but with its movements continuously out of phase with the movements of the primary mass; and the resultant or sum of the acceleration forces of the primary mass and the countermass is continuously counterbalanced by counterweight means which are mounted for rotation with the shaft in eccentric relation thereto—all so that the acceleration forces of the mass to be reciprocated may be constantly counteracted and counterbalanced in a way preventing them from harmfully overstressing or vibrating the machine.

According to a further feature of the invention, means are provided for adjusting the eccentricity of the eccentric connection to thereby adjust the stroke of the reciprocations of the primary mass and the countermass, and the counterweight means include a plurality of counterweights which are mounted on the shaft so that at least one of them may be repositioned angularly upon any adjustment of the stroke so as to adjust correspondingly the magnitude and the location of the counterbalancing moment of the counterweights.

These and other objects, features and advantages of the invention will become apparent from the following detailed description of an illustrative embodiment thereof, and from the accompanying drawing in which:

FIG. 1 is a top plan view of a reciprocation balancing device embodying the invention;

FIG. 2 is a detailed sectional view taken along line 2—2 of FIG. 1; and

FIG. 3 is a detailed sectional view taken along line 3—3 of FIG. 1.

Referring to the drawing, the illustrated embodiment of the invention includes a shaft 82 and a connecting rod 30 to which rectilinear reciprocating motion is to be imparted by rotation of the shaft 82. A mass M to be reciprocated, such, for example, as the wiping carriage of the above-identified copending application, is secured to the connecting rod 30 so as to be reciprocated by the movement of that rod.

The shaft 82 is rotatably mounted in bearings 83 carried by supports 84 extending from a suitable frame member 17. At its lower end, shaft 82 carries a bevel gear 85 meshing with a bevel gear 86 on a horizontal drive shaft 87 which is rotated by a suitable motor (not shown). At its upper end, shaft 82 has a reduced diameter extension 88 the axis 79 of which (FIG. 1) is eccentrically offset by a distance $d_1$ (FIG. 3) relative to the axis 77 of the rotation of shaft 82.

Two counterweights 89 and 90 are mounted on the eccentric extension 88 of shaft 82. Counterweight 89 has a hub 91 formed with a cylindrical outer bearing surface having its axis 78 eccentric to the axis of extension 88 by a radial distance $d_2$ (FIG. 3), and carrying a ball bearing set 92 seated within a yoke by which connecting rod 30 is connected to the hub 91.

In order to secure the counterweights 89 and 90 on the extension 88, the combined axial lengths of the hubs of the counterweights are preferably greater than the length of the extension 88, and a clamping plate 93 is provided to abut against the upper end of the hub 91 and to receive a screw 94 which extends into a tapered axial bore in the upper end of extension 88. Thus, when screw 94 is tightened, the hubs of counterweights 89 and 90 are axially clamped between the plate 93 and a radial shoulder 95 defined at the transition of shaft 82 into extension 88.

The reciprocation balancing device further includes an oscillating counterweight 96 providing an effective mass substantially equal to that of the mass M secured to the connecting rod 30. The weight 96 is pivotally connected, as at 97, to one end of a connecting link 98 which is, in turn, pivotally connected to the yoke of the connecting rod 30, as at 99, so that the weight 96 is reciprocated in the direction of the arrow B (FIG. 1) at right angles to the direction of reciprocation of the mass M secured to the connecting rod 30. The latter direction is indicated by the arrow A in FIG. 3. Thus, the reciprocation of the counterweight 96 is 90° out of phase with respect to the reciprocation of the mass to be controlled.

The weight 96 may be mounted for reciprocation generally in the direction of the arrow B by parallel arms 100 which, at one end, are rockably mounted on vertical pins 101 carried by a support 102 on the frame 17 and, at the other end, carry vertical pins 103 received in suitable bearings in the weight 96.

In the illustrated mechanism, the distances $d_1$ and $d_2$ are equal so that, by turning the hub 91 relative to the eccentric extension 88, i.e., adjusting its angular position relative to shaft 82, the total eccentricity of the bearing 92 with respect to the axis of shaft 82 may be varied between a maximum value equal to the sum of the distances $d_1$ and $d_2$ and a minimum value of zero, thereby to permit adjustment of the length of the reciprocating stroke of the mass secured to the connecting rod 30.

In the drawings, the hub 91 is shown adjusted to a position where rotary movement of the shaft 82 produces a maximum reciprocating stroke of the connecting rod 30 and of the masses moved therewith. To secure this position of maximum stroke, the clamp 93 being loosened, counterweight 89 is turned on the shaft extension 88 so as to place hub 91 in a position where the axes 77 and 78 are disposed at opposite sides of axis 79 on a straight line intersecting the three axes. When the hub is set in that position, the centers of the counterweights 89 and 90 are at the same angular position relative to shaft 82. The center of the rotational moment of the two counterweights is now at a side of axis 77 diametrically opposite to the location of the axis 78 and the peak eccentricity of the hub 91 with respect to the axis. The resultant or loads of the acceleration forces of the primary mass and the countermass are applied at the axis 78 of hub 91.

Hence, as the shaft 82 is rotated, the moment of the counterweights 89 and 90 counterbalances the resultant of the acceleration forces arising from the respective reciprocatory movements of the primary mass and the countermass 96. Since the masses are so arranged and connected to the yoke on shaft 82 that they move substantially at right angles to one another, in out of phase relation by approximately 90°, the resultant or sum of the acceleration forces exerted by the two masses on the shaft 82 will be approximately constant for any given length of their stroke and any given speed of the shaft and, therefore, will be continuously counterbalanced by the constant rotational moment of the counterweights.

When a stroke shorter than the maximum is desired, the hub 91 and counterweight 89 are turned and reset together to another angular position on the eccentric extension 88, at which the eccentricity of axis 78 with respect to the shaft axis 77 will give the desired stroke length. Counterweight 90 may be left in its original position. Since the distances $d_1$ and $d_2$ are equal and the adjustment is effected about axis 79, a plane passing through the axes 77 and 78 will now approximately bisect the angle formed at axis 77 by lines passing through that axis and the centers of gravity of the two counterweights 89 and 90.

The effective eccentric masses of those counterweights being approximately equal, the center of their rotational moment will still be aligned with the axes 77 and 78. Moreover, the magnitude of their moment effective at that center will be reduced so as still to correspond substantially to the resultant of the acceleration forces of the reciprocating masses, the ratio of these forces, hence of their resultant, to the speed of rotation of the shaft 82 having been reduced by the reduction of the eccentric radius 77—78 which govern the stroke length.

Although an illustrative embodiment of the invention has been described in detail herein with reference to the accompanying drawing, it is to be understood that the invention may be embodied in various other forms of apparatus and that modifications, omissions and substitutions may be effected in the parts and their arrangements without departing from the scope or spirit of the invention which is intended to be defined by the appended claims.

What is claimed is:

1. A mechanism for driving and balancing the movements of a reciprocatory mass, comprising:
   a rotary shaft,
   driving means for rotating said shaft,
   means for connecting the mass with said shaft so that as said shaft is rotated the mass is reciprocated, said means including a pivot eccentric to the shaft and the axis of which is rotated about the axis of the shaft with rotation of the shaft,
   a countermass mounted for reciprocatory movement,
   means connecting said countermass for reciprocation thereof with the rotation of said shaft and the reciprocation of said mass but out of phase with the latter, and
   counterweight means mounted for rotation with said shaft in eccentric relation thereto, the center of moment of said counterweight means being disposed to a side of the axis of rotation opposite to the side occupied by said pivot axis so as to counterbalance the resultant of the acceleration forces of said mass and said countermass.

2. A mechanism for driving and balancing the movements of a reciprocatory mass, comprising:
   a rotary shaft,
   driving means for rotating said shaft,
   means pivoted eccentrically on said shaft for connecting the mass with said shaft so that as said shaft is rotated the mass is reciprocated, the axis of said pivoted means being rotated about the axis of said shaft with rotation of said shaft,
   a countermass mounted for reciprocatory movement and having approximately the same effective weight as said mass,
   means connecting said countermass with said pivoted means so that the rotation of said shaft reciprocates said countermass approximately 90° out of phase with said mass, and
   counterweight means mounted on said shaft for rotation herewith in eccentric relation thereto, the center of moment of said counterweight means being disposed to a side of the axis of rotation opposite to the side occupied by the axis of said pivoted means so as to counter-balance the resultant of the acceleration forces of said said mass and said countermass.

3. A mechanism as claimed in claim 2, said countermass being pivoted on substantially parallel mounting arms which are pivotally mounted to oscillate on substantially fixed parallel vertical axes.

4. A mechanism for balancing the movements of a reciprocatory mass, comprising:
   a rotary shaft,
   driving means for rotating said shaft,
   means for connecting the mass with said shaft so that as said shaft is rotated the mass is reciprocated, said means including a pivot eccentric to the shaft and the axis of which is rotated about the axis of the shaft with rotation of the shaft,
   a countermass mounted for reciprocatory movement,
   said countermass being connected with said connecting means for reciprocation with the rotation of said shaft and the reciprocation of said mass but out of phase with the latter,
   counterweight means mounted for rotation with said shaft in eccentric relation thereto, the center of moment of said counterweight means being disposed to a side of the axis of rotation opposite to the side occupied by said pivot axis, so as to counterbalance the resultant of the acceleration forces of said mass and said countermass, and
   means for adjusting the eccentricity of said pivot to adjust the length of the reciprocation strokes of said mass and said countermass.

5. A mechanism for balancing the movements of a reciprocatory mass, comprising:
   a rotary shaft,
   driving means for rotating said shaft,
   means for connecting the mass with said shaft so that as said shaft is rotated the mass is reciprocated, said means including a pivot eccentric to the shaft and the axis of which is rotated about the axis of the shaft with rotation of the shaft,
   a countermass mounted for reciprocatory movement,
   said countermass being connected with said connecting means for reciprocation with the rotation of said shaft and the reciprocation of said mass but out of phase with the latter, counterweight means mounted for rotation with said shaft in eccentric relation thereto, the center of moment of said counterweight means being disposed to a side of the axis of rotation diametrically opposite to said pivot axis, so as to counterbalance the resultant of the acceleration forces of said mass and said countermass, means for adjusting the eccentricity of said pivot to adjust the length of the reciprocation strokes of said mass and said countermass, the ratio of the speed of the reciprocatory movements to the speed of the shaft rotation being varied by a change of said eccentricity, and means for relocating said counterweight means relative to said shaft so as to vary according to each variation of said ratio the magnitude of the counterbalancing moment of said counterweight means while keeping the center thereof diametrically opposite to said pivot axis.

6. A mechanism for driving and balancing the movements of a reciprocatory mass, comprising:

a shaft mounted for rotation on a fixed axis and having an eccentric portion, driving means for rotating said shaft, an eccentric hub fixed on said eccentric portion, said hub having an outer annular bearing surface the axis of which is spaced from the axis of said eccentric portion, a yoke mounted on and rotatably receiving said bearing surface, means for connecting said yoke with said mass so that rotation of said shaft will reciprocate said mass through a stroke determined by the angular position of said hub relative to said eccentric portion, a countermass mounted for reciprocatory movement, means connecting said yoke with said countermass so that rotation of said shaft reciprocates said countermass approximately 90° out of phase with said mass, counterweights mounted on and eccentric to said shaft for rotation therewith to counterbalance the resultant of the acceleration forces of said mass and said countermass, said hub being turnable to and settable at any desired angular position on said eccentric portion to adjust the stroke of the reciprocations, the angular position of at least one of said counterweights relative to said shaft being adjustable correspondingly to vary the magnitude and the location of the counterbalancing moment of said counterweights.

7. A mechanism as claimed in claim 6, the axis of said bearing surface being spaced from the axis of said eccentric portion by approximately the same distance as the latter is spaced from the axis of said shaft, said one counterweight and said hub being turnable and settable together on said eccentric portion to adjust their respective angular positions, the centers of the masses of said counterweight being disposed in alignment to one side of the shaft axis at a location diametrically opposite to the axis of said bearing surface when said hub is set to give the maximum stroke of the reciprocations.

8. A device for reciprocating a mass comprising a rotated shaft, eccentric means on said shaft, a connecting rod connected, at its opposite ends, to said eccentric means and to the mass, respectively, so that rotation of said shaft causes rectilinear reciprocation of the mass, an auxiliary mass reciprocable in a direction at right angles to the direction of reciprocation of the first mentioned mass, means connecting said auxiliary mass to said eccentric means so that said auxiliary mass is reciprocated 90° out of phase with respect to the reciprocation of said first mass, and counterweight means rotating with said shaft to dynamically balance the resultant of the acceleration forces of said masses.

9. A device as in claim 8; further comprising means for varying the eccentricity of said eccentric means, thereby to adjust the length of the reciprocating stroke of said first mass, said counterweight means being connected to said eccentric means and being adjusted in position upon a variation of said eccentricity for maintaining the dynamic balance for any adjusted length of the reciprocating stroke.

10. A device as in claim 8; wherein said eccentric means includes an eccentric extension on said shaft, a hub turnable on said extension and having a cylindrical outer surface which is eccentric with respect to the axis of said extension so that the total eccentricity of said outer surface of the hub can be adjusted by turning the latter relative to said extension, means to clamp said hub in any adjusted position relative to said extension, and means rotatably connecting one end of said rod to said outer surface of the hub; and wherein said counterweight means includes a first counterweight fixed on said extension and a second counterweight integral with said hub so that, as the latter is turned relative to said extension to vary the total eccentricity, said second counterweight turns relative to said first counterweight to correspondingly vary the total balancing effect of said first and second counterweights.

References Cited in the file of this patent

UNITED STATES PATENTS

| | | |
|---|---|---|
| 1,966,319 | Stroedter | July 10, 1934 |
| 2,438,756 | Larsen | Mar. 30, 1948 |
| 2,516,335 | Nevin et al. | July 25, 1950 |
| 2,610,524 | Maust | Sept. 16, 1952 |
| 2,784,598 | Larsen | Mar. 12, 1957 |
| 2,819,618 | Slusher | Jan. 14, 1958 |